UNITED STATES PATENT OFFICE.

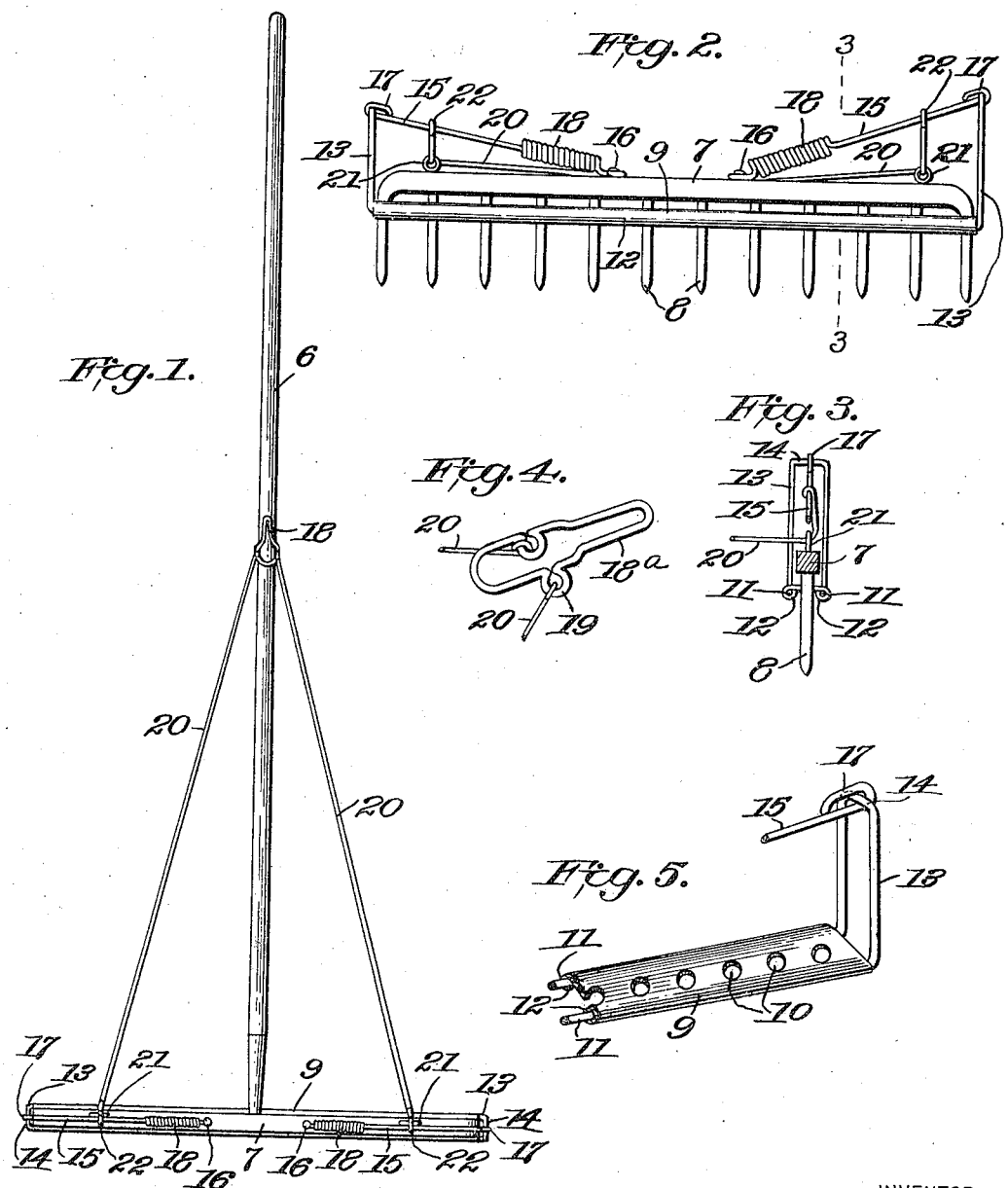

JACK McGINN, OF OAKLAND, CALIFORNIA, ASSIGNOR OF ONE-THIRD TO LOLA F. THORNTON AND JOSEPH N. THORNTON, BOTH OF OAKLAND, CALIFORNIA.

DISLODGING ATTACHMENT FOR RAKES.

1,310,868.      Specification of Letters Patent.      Patented July 22, 1919.

Application filed January 15, 1918. Serial No. 211,972.

*To all whom it may concern:*

Be it known that I, JACK McGINN, a citizen of the United States, residing at Oakland, in the county of Alameda and State of California, have invented certain new and useful Improvements in Dislodging Attachments for Rakes, of which the following is a specification.

This invention relates to a dislodging attachment or device for rakes and other implements or tools having tines. I aim to provide an effective means for dislodging adhering matter from the tines of the implement or tool, a means which is satisfactory and durable in use and capable of ready and rapid manipulation.

The particular details of construction, other objects and advantages will become apparent as the description of the device progresses with respect to accompanying drawings, wherein one preferred embodiment is illustrated and:—

Figure 1 is a top or plan view of a rake having my improvements associated therewith;

Fig. 2 is a front elevation looking toward the rake head, and on an enlarged scale;

Fig. 3 is a cross sectional view on the line 3—3 of Fig. 2;

Fig. 4 is a detail perspective view of the operating member for the dislodging device; and Fig. 5 is a fragmentary perspective view of the dislodging member.

By way of example, I have shown a rake as the implement with which my improvements may be associated. This rake has the usual handle 6 and head 7 from which tines 8 depend.

The dislodging member may comprise a metallic plate 9 having openings 10 in which the tines 8 are disposed as suggested in Figs. 2 and 3. A suitable means is provided whereby the plate or dislodging member 9 may be moved longitudinally of the tines so as to dislodge matter which may adhere thereto in use.

A suitable wire frame is provided to rigidify the plate 9 and this frame has longitudinal strands 11 around which portions 12, being the longitudinal edge portions of plate 9, are curled. From strands 11, at the ends of the plate 9, vertical portions 13 rise which are connected by bridges 14 at the tops. Suitable spring wires or arms 15 are fastened as at 16 to the heads 7 and have loops 17 providing elongated slots through which the bridges 14 are disposed. To increase the resiliency of the members 15, and normally maintain them raised as in Fig. 2, coil spring portions at 18 are provided. It will be seen that the members 15 normally maintain the dislodging member 9 raised. These members may be depressed so that member 9 may have dislodging movement. After such movement, upon releasing the springs 15, they will return the dislodging member to the normal position shown in Figs. 2 and 3 where it will not interfere with the work of the implement.

I preferably provide a means to depress the spring members 15 to slide the dislodging member, without the operator having to bend over. To this end, I provide an operating handle preferably made of a single strand of wire as shown in Fig. 4. This member is of any general configuration, having for instance a handle proper at 18ª and eyelets 19. The eyelets 19 will frictionally engage the handle 6 so that the operating member will frictionally hold itself in place on the handle and at the same time in such a manner that it may be readily moved longitudinally of or slide along the handle 6. Fastened to the eyelets 19 are cords or flexible members 20 which extend through eyelets 21 secured to the handle 7 and finally are fastened to the spring rods 15 as at 22. It will be apparent that as a result of this construction, sliding movement of the operating member toward the free end of handle 6 will lower the springs 15 and accordingly the dislodging member 9. Springs 18 will restore the dislodging member to its normal position and during such restoring movement, will slide the operating member to its original position, as the frictional engagement between this member and the handle 6 will not interfere with such movement.

Since I have illustrated and described merely one preferred embodiment of the invention, it will be understood that changes in the details of construction may be resorted to without departing from the spirit and scope of the invention as defined by appended claims.

I claim:—

1. In combination with an implement having tines, a material dislodging member therefor, spring arms rigidly secured to the head of said implement and connected to the said member to normally hold the dislodging member inactive, guides mounted on the head of said implement below said spring arms, flexible members connected to the spring arms and passing through said guides, and a slidable operating means connected to said flexible member and carried by the handle of said implement.

2. In combination with an implement having tines, a material dislodging member movable relative thereto having a plate, a reinforcing wire for said plate having upstanding portions at each end provided with a bridge, spring members connected to the head of the implement having elongated slots into which said bridges are disposed, and means to move the dislodging member.

3. In combination with an implement having tines, a material dislodging plate having openings through which the tines extend, a reinforcing frame for the plate, the plate having edges curled around said frame, said frame having upstanding portions provided with a bridge, spring arms secured to the implement and having elongated slots, said bridges being disposed in said slots, flexible members operable to depress the arms and the spring members, thereby operating the dislodging member, and guide means on the implement for said flexible members.

4. In combination with an implement having tines, material dislodging means therefor, an operating member carried by the handle of said implement having a plurality of eyelets formed in the body thereof, said eyelets partially enveloping and frictionally engaging the handle of the implement, and flexible means extending from said eyelets and operatively connected to the dislodging member.

In testimony whereof I affix my signature in presence of two witnesses.

JACK McGINN.

Witnesses:
FRANK E. POLK,
JAMES McGINN.

Copies of this patent may be obtained for five cents each, by addressing the "Commissioner of Patents, Washington, D. C."